(12) United States Patent
Hampapur et al.

(10) Patent No.: US 8,243,987 B2
(45) Date of Patent: Aug. 14, 2012

(54) OBJECT TRACKING USING COLOR HISTOGRAM AND OBJECT SIZE

(75) Inventors: Arun Hampapur, Norwalk, CT (US); Ying-li Tian, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1102 days.

(21) Appl. No.: 12/134,267

(22) Filed: Jun. 6, 2008

(65) Prior Publication Data

US 2009/0304229 A1    Dec. 10, 2009

(51) Int. Cl.
*G06K 9/00* (2006.01)

(52) U.S. Cl. ........................................ 382/103; 382/173

(58) Field of Classification Search .................. 382/103, 382/100, 106, 107, 170, 270, 173, 143, 165, 382/171; 348/154
See application file for complete search history.

(56) References Cited

U.S. PATENT DOCUMENTS

| | | | |
|---|---|---|---|
| 5,473,369 A | 12/1995 | Abe | |
| 6,181,820 B1 | 1/2001 | Tachikawa et al. | |
| 6,404,900 B1 | 6/2002 | Qian et al. | |
| 6,477,272 B1 | 11/2002 | Krumm et al. | |
| 6,754,389 B1 | 6/2004 | Dimitrova et al. | |
| 7,149,325 B2* | 12/2006 | Pavlidis et al. | 382/103 |
| 7,418,113 B2* | 8/2008 | Porikli et al. | 382/103 |
| 2003/0040815 A1* | 2/2003 | Pavlidis | 700/48 |
| 2004/0130620 A1* | 7/2004 | Buehler et al. | 348/143 |
| 2006/0018516 A1* | 1/2006 | Masoud et al. | 382/115 |
| 2006/0038892 A1 | 2/2006 | Zanzucchi et al. | |
| 2007/0086621 A1* | 4/2007 | Aggarwal et al. | 382/103 |
| 2007/0183662 A1* | 8/2007 | Wang et al. | 382/173 |
| 2007/0183663 A1* | 8/2007 | Wang et al. | 382/173 |
| 2009/0087088 A1* | 4/2009 | Chen et al. | 382/165 |

OTHER PUBLICATIONS

S.T. Birchfield, "Elliptical Head Tracking Using Intensity Gradients and Color Histograms," IEEE CVPR '98, pp. 232-237, 1998.
M. Isard and A. Blake, "Condensation-Conditional Density Propagation for Visual Tracking," Int. Journal of Computer Vision, vol. 29, No. 1, pp. 5-28, 1998.
Balcells et al., "An Appearance Based Approach for Consistent Labeling of Humans and and Objects in Video," Pattern Analysis and Applications (PAA), vol. 7, No. 4, pp. 373-385, Dec. 2004.
D. Comaniciu, V. Ramesh, and P. Meer, "Real-Time Tracking of Non-Rigid Objects using Mean Shift," IEEE CVPR '00, vol. 2, pp. 142-149, 2000.
I. Haritaoglu, D. Harwood, and L.S. Davis. W4: Real-Time Surveillance of People and Their Activities. IEEE Trans. Pattern Analysis and Machine Intelligence, 22(8): 809-830, Aug. 2000.
M. Isard and J. MacCormick. BraMBLe: A Bayesian Multiple-Blob Tracker. International Conf. on Computer Vision, vol. 2, pp. 34-41, 2001.

(Continued)

*Primary Examiner* — Vikkram Bali
*Assistant Examiner* — Nancy Bitar
(74) *Attorney, Agent, or Firm* — Hoffman Warnick LLC; Anna L. Linne

(57) ABSTRACT

A solution for monitoring an area uses color histograms and size information (e.g., heights and widths) for blob(s) identified in an image of the area and model(s) for existing object track(s) for the area. Correspondence(s) between the blob(s) and the object track(s) are determined using the color histograms and size information. Information on an object track is updated based on the type of correspondence(s). The solution can process merges, splits and occlusions of foreground objects as well as temporal and spatial fragmentations.

19 Claims, 8 Drawing Sheets

OTHER PUBLICATIONS

T. Liu and H. Chen, "Real-Time Tracking Using Trust-Region Methods," IEEE Transactions on Pattern Analysis and Machine Intelligence (TPAMI), 26(3): 397-402, Mar. 2004.

S.J. McKenna, et al., "Tracking Groups of People," Computer Vision and Image Understanding, vol. 80, No. 1, pp. 42-56, 2000.

H. Nguyen and A. Smeulders, "Fast Occluded Object Tracking by a Robust Appearance Filter," IEEE Transactions on Pattern Recognition and Machine Intelligence (TPAMI), 26(8): 1099-1104, Aug. 2004.

H. Roh, S. Kang, and S. Lee, "Multiple People Tracking Using an Appearance Model Based on Temporal Color," Proc. International Conference on Pattern Recognition, vol. 4, pp. 643-646, 2000.

A. Senior, A. Hampapur, Y. Tian, L. Brown, S. Pankanti and R. Bolle, "Appearance Models for Occlusion Handling," Proc. of the 2nd IEEE International Workshop on PETS, 2001.

C. Stauffer and E. Grimson, "Learning patterns of activity using real-time tracking," IEEE Transactions on Pattern Recognition and Machine Intelligence (TPAMI), 22(8): 747-757, 2000.

C. Wren, et al., "Pfinder: Real-time Tracking of the Human Body," IEEE Trans. On Pattern Analysis and Machine Intelligence, vol. 19, No. 7, pp. 780-785, Jul. 1997.

* cited by examiner

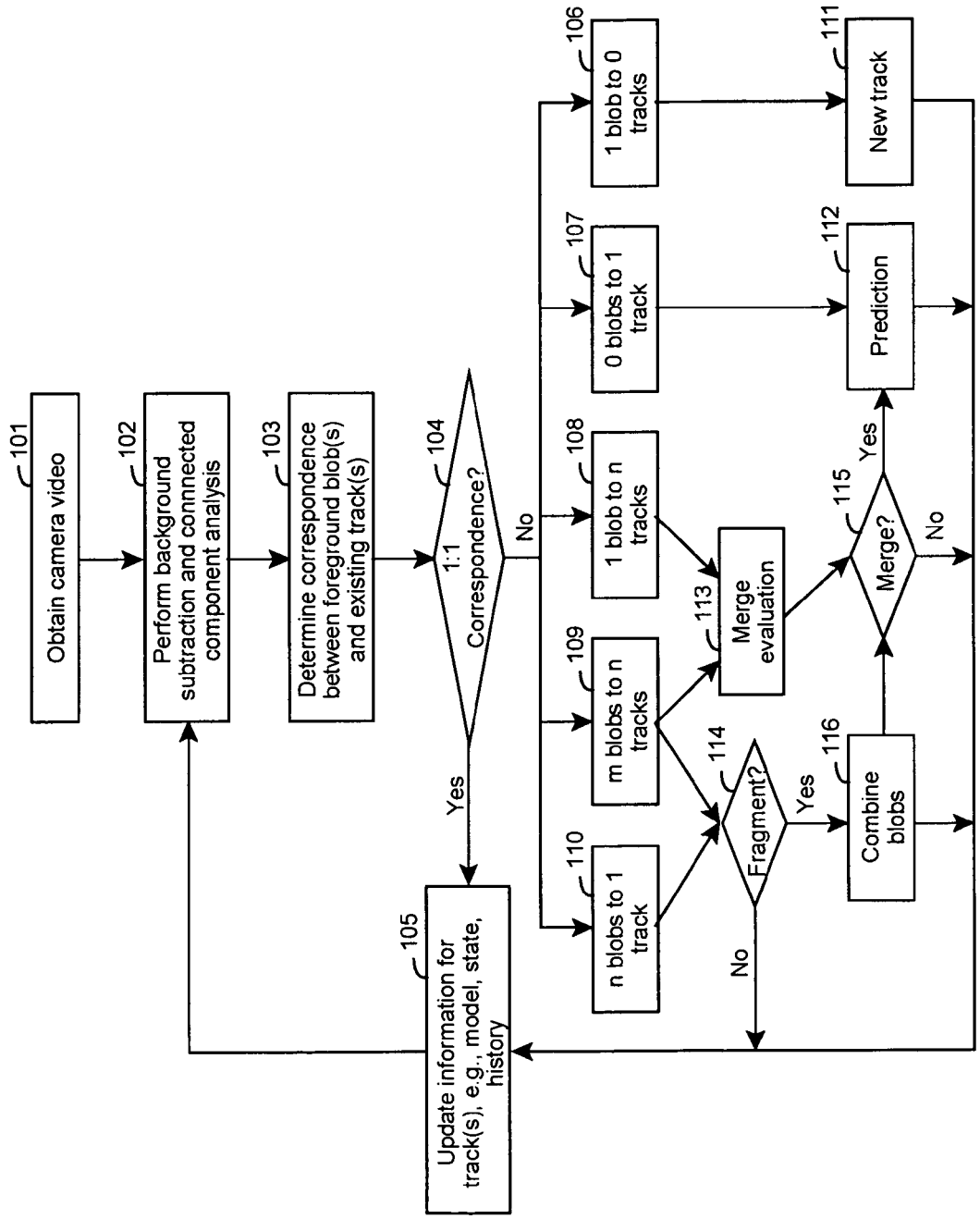

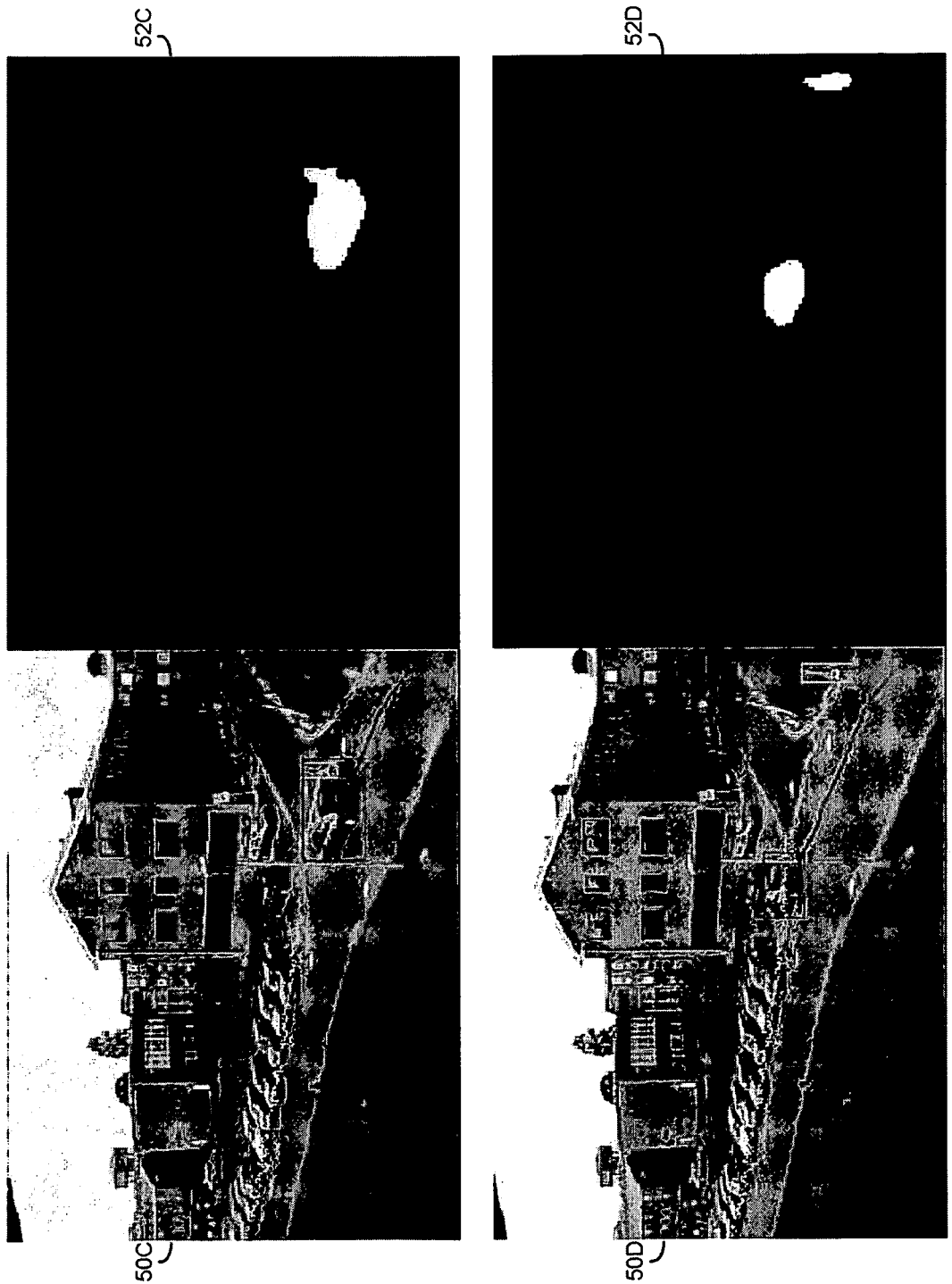

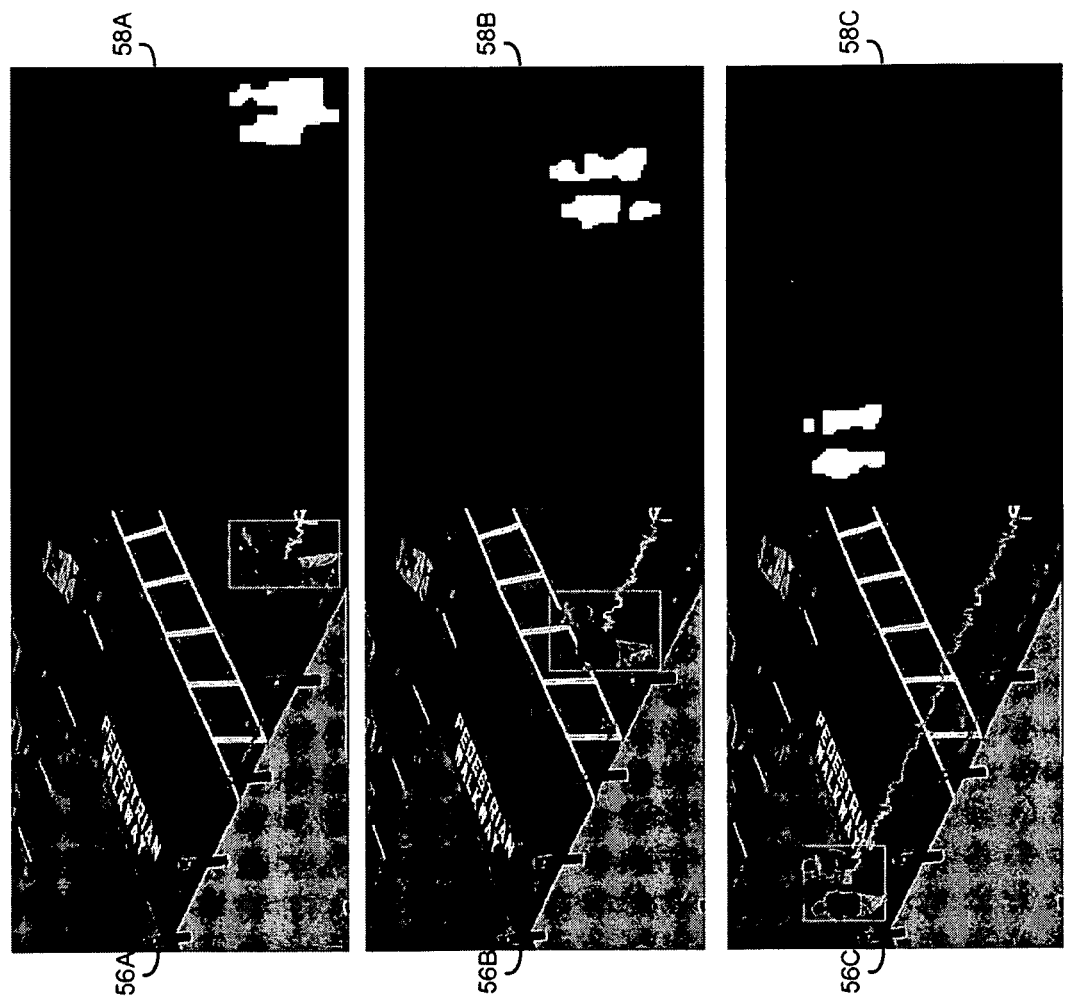

OBJECT TRACKING USING COLOR HISTOGRAM AND OBJECT SIZE

TECHNICAL FIELD

The disclosure relates generally to object tracking, and more particularly, to an improved solution for tracking moving objects in an area.

BACKGROUND ART

An ability to efficiently and robustly track objects in video is an important function of a surveillance system. Occlusion is one of the most significant challenges in successfully detecting and tracking moving objects. Many approaches have been proposed for tracking objects in video and addressing occlusions. One approach combined a grey-scale texture appearance and shape information to track people in an outdoor environment, while assuming that the whole body of each person is visible for groups of people. Another approach tracked multiple people in the presence of occlusions by using a temporal color-based appearance model with associated weights that are determined by the size, duration, frequency, and adjacency of the object. Another approach employs an appearance model to segment objects during partial occlusions and resolve depth ordering of objects in completed occlusions. Still another approach uses a non real-time tracking system to track human interactions for indoor environments based on a color correlogram and assumes that the humans are relatively large. In this approach, to build the color model, it is assumed that each foreground blob corresponds to only one person when the track begins. Yet another approach uses a very simple multiple-hypotheses based tracking method based on the foreground blobs.

Several approaches use a background subtraction (BGS) solution in order to initially detect moving objects. To this extent, imperfect BGS is a common problem in object tracking. In particular, due to limited resolution of the image and/or limits in the BGS solution, an object may be split into multiple "blobs" (i.e., spatial fragmentation) or disappear for one or more frames (i.e., temporal fragmentation) after BGS is performed on the image.

SUMMARY OF THE INVENTION

As surveillance systems implement more and more cameras, the inventors recognize a need in the art for a tracking solution that requires less processing than the current approaches, thereby enabling the processing of additional video data using the same computing resources and/or requiring fewer computing resources for additional video streams (e.g., more cameras) than any of the current approaches. Embodiments of the invention provide an efficient tracking solution to track multiple objects using a static camera. For example, aspects of the invention provide a solution that handles object events such as merges, splits, and occlusions, as well as problems due to an imperfect BGS, such as spatial and temporal fragmentation.

Aspects of the invention provide a solution for monitoring an area uses color histograms and size information (e.g., heights and widths) for blob(s) identified in an image of the area and model(s) for existing object track(s) for the area. Correspondence(s) between the blob(s) and the object track(s) are determined using the color histograms and size information. Information on an object track is updated based on the type of correspondence(s). The solution can process merges, splits and occlusions of foreground objects as well as temporal and spatial fragmentations.

A first aspect of the invention provides a method of monitoring an area, the method comprising: obtaining blob information for at least one blob in a set of blobs identified in an image of the area, each blob corresponding to a region of the image that may include a foreground object, the blob information including a color histogram, a height, and a width for the at least one blob; determining a correspondence between the at least one blob and a set of object tracks using the blob information and a model for each object track, wherein the model includes a color histogram, a height, and a width for a tracked object; and updating information on the set of object tracks based on the determining.

A second aspect of the invention provides a system for monitoring an area, the system comprising: a component configured to obtain blob information for at least one blob in a set of blobs identified in an image of the area, each blob corresponding to a region of the image that may include a foreground object, the blob information including a color histogram, a height, and a width for the at least one blob; a component configured to determine a correspondence between the at least one blob and a set of object tracks using the blob information and a model for each object track, wherein the model includes a color histogram, a height, and a width for a tracked object; and a component configured to update information on the set of object tracks based on the determined correspondence.

A third aspect of the invention provides a computer program comprising program code embodied in at least one computer-readable medium, which when executed, enables a computer system to implement a method of monitoring an area, the method comprising: obtaining blob information for at least one blob in a set of blobs identified in an image of the area, each blob corresponding to a region of the image that may include a foreground object, the blob information including a color histogram, a height, and a width for the at least one blob; determining a correspondence between the at least one blob and a set of object tracks using the blob information and a model for each object track, wherein the model includes a color histogram, a height, and a width for a tracked object; and updating information on the set of object tracks based on the determining.

A fourth aspect of the invention provides a method of generating a system for monitoring an area, the method comprising: providing a computer system operable to: obtain blob information for at least one blob in a set of blobs identified in an image of the area, each blob corresponding to a region of the image that may include a foreground object, the blob information including a color histogram, a height, and a width for the at least one blob; determine a correspondence between the at least one blob and a set of object tracks using the blob information and a model for each object track, wherein the model includes a color histogram, a height, and a width for a tracked object; and update information on the set of object tracks based on the determining.

A fifth aspect of the invention provides a method comprising: at least one of providing or receiving a copy of a computer program that is embodied in a set of data signals, wherein the computer program enables a computer system to implement a method of monitoring an area, the method comprising: obtaining blob information for at least one blob in a set of blobs identified in an image of the area, each blob corresponding to a region of the image that may include a foreground object, the blob information including a color histogram, a height, and a width for the at least one blob; determining a correspondence between the at least one blob and a set of object tracks using the blob information and a model for each object track, wherein the model includes a color histogram, a height, and a width for a tracked object; and updating information on the set of object tracks based on the determining.

Other aspects of the invention provide methods, systems, program products, and methods of using and generating each, which include and/or implement some or all of the actions described herein. The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

FIG. 2 shows an illustrative process for monitoring an area according to an embodiment.

FIGS. 3A-D show an illustrative series of tracking visualizations and BGS results generated based on the corresponding original images for an outdoor environment according to an embodiment.

FIG. 5 shows another illustrative series of tracking visualizations and BGS results generated based on the corresponding original images according to an embodiment.

It is noted that the drawings are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, aspects of the invention provide a solution for monitoring an area that uses color histograms and size information (e.g., heights and widths) for blob(s) identified in an image of the area and model(s) for existing object track(s) for the area. Correspondence(s) between the blob(s) and the object track(s) are determined using the color histograms and size information. Information on an object track is updated based on the type of correspondence(s). The solution can process merges, splits and occlusions of foreground objects as well as temporal and spatial fragmentations. As used herein, unless otherwise noted, the term "set" means one or more (i.e., at least one) and the phrase "any solution" means any now known or later developed solution. Further, it is understood that the term "object", when used to refer to a tracked entity, is inclusive of both a single entity being tracked (e.g., a vehicle, an individual walking, etc.) or a group of entities that are being tracked together (e.g., a group of people walking).

Figure 1:
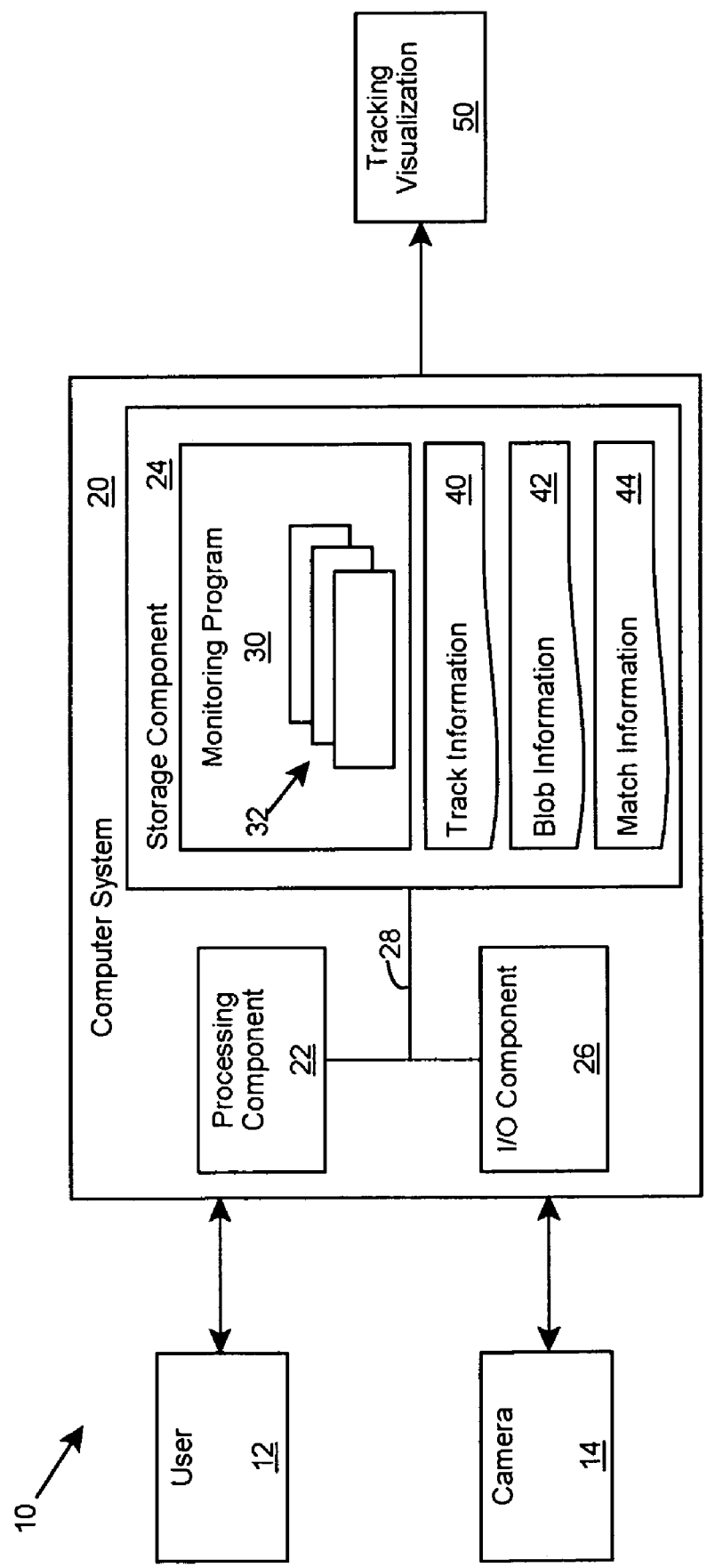
FIG. 1 shows an illustrative environment for monitoring an area according to an embodiment.
Figure 3A:
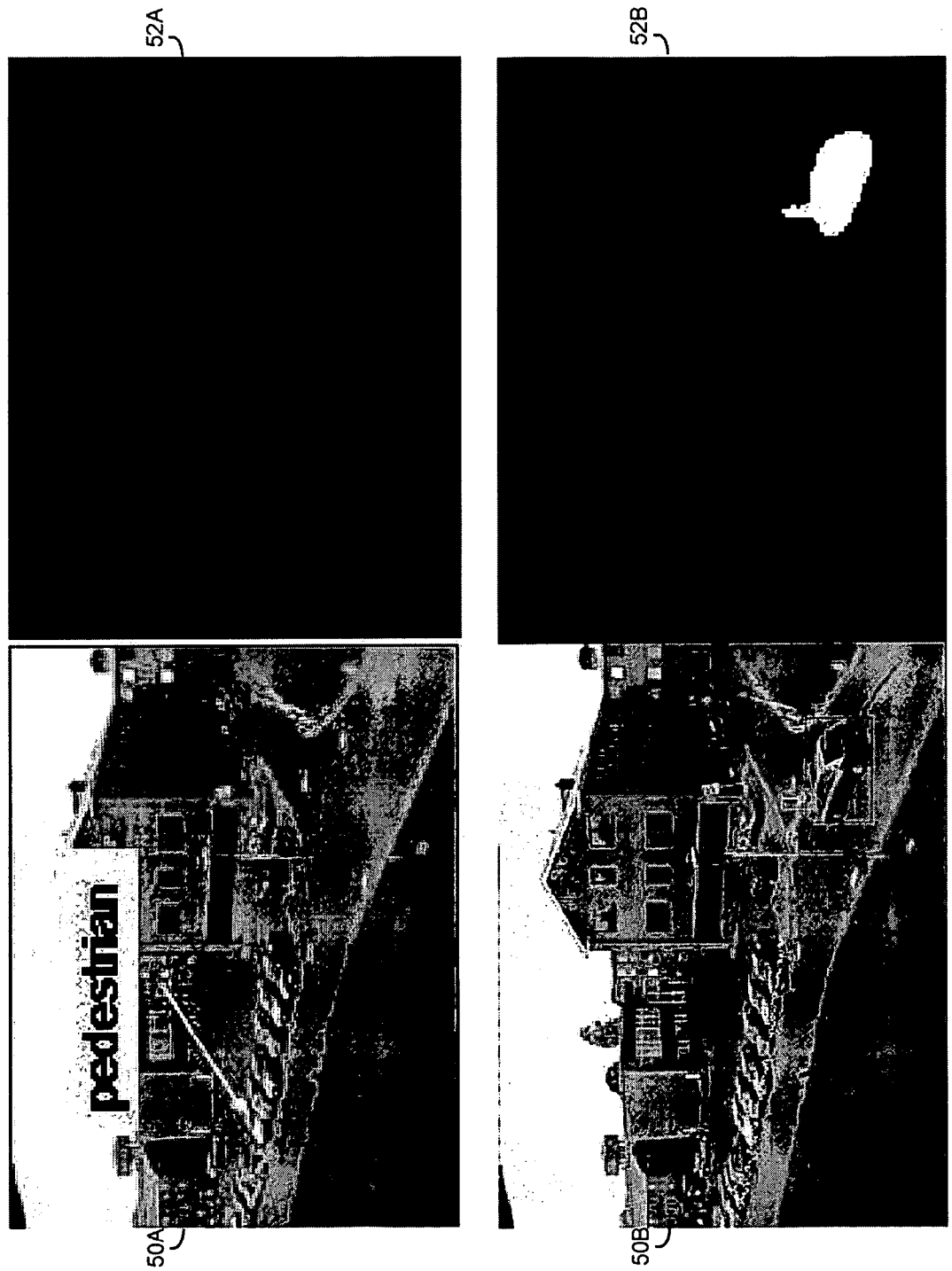
Figure 3C:
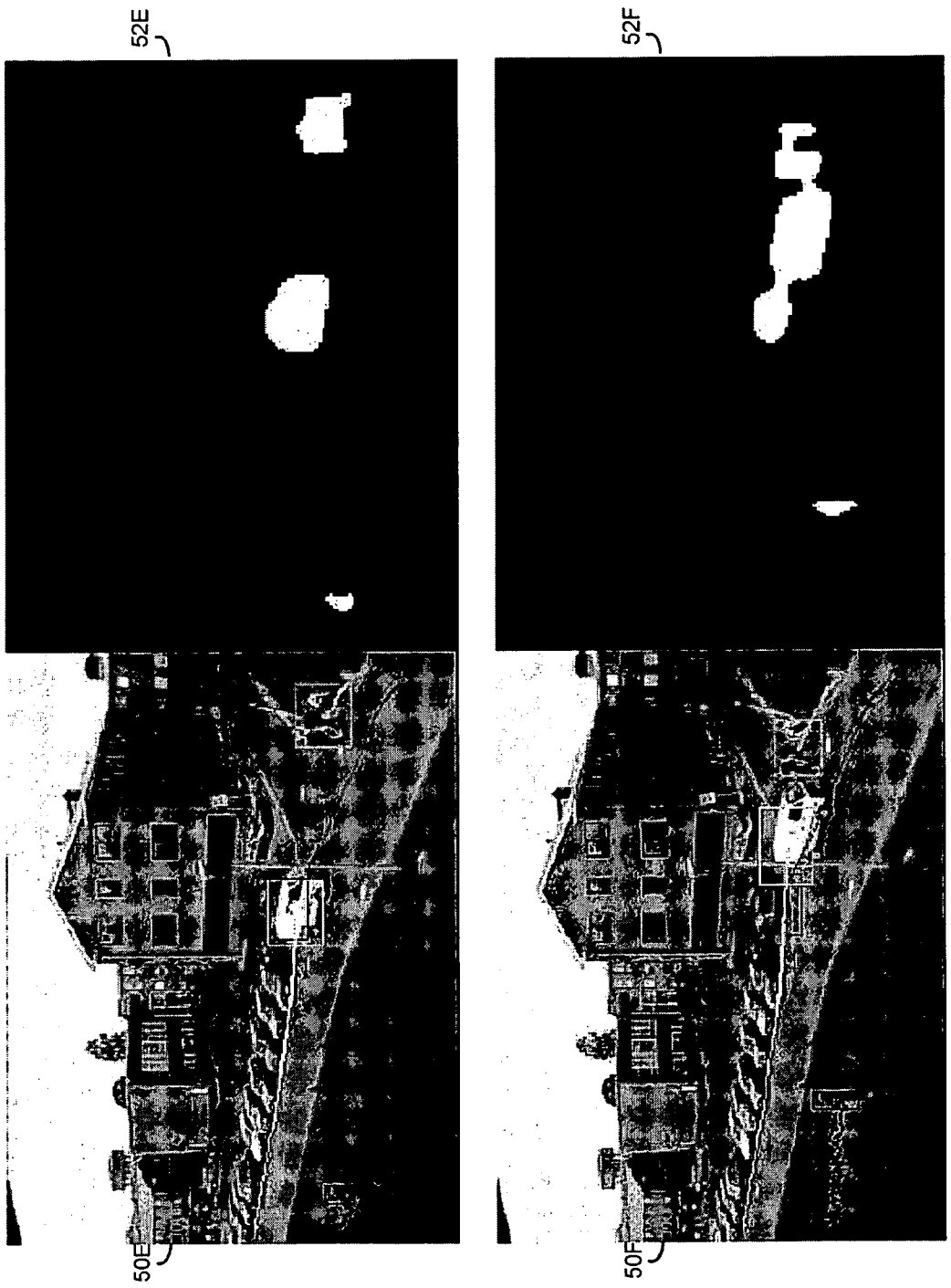
Figure 3D:
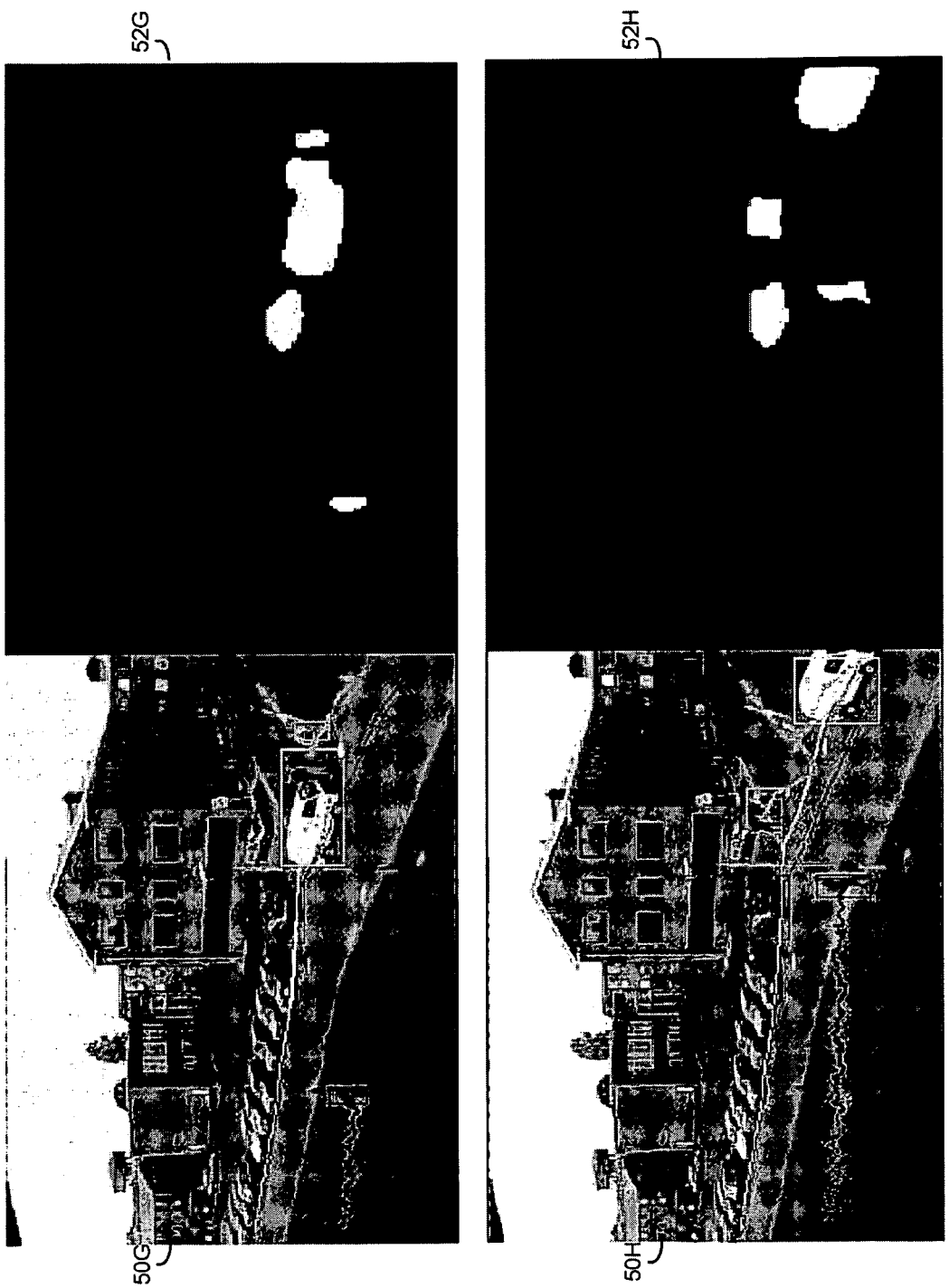

Turning to the drawings, FIG. 1 shows an illustrative environment 10 for monitoring an area according to an embodiment. To this extent, environment 10 includes a computer system 20 that can perform the process described herein in order to monitor the area. In particular, computer system 20 is shown including a monitoring program 30, which makes computer system 20 operable to monitor the area by receiving a series of images (e.g., video) from camera 14 and performing the process described herein. It is understood that the monitored area can comprise a single continuous physical location or multiple physical locations, at least some of which may be physically disjointed from the other physical locations. To this extent, it is understood that while only a single camera 14 is shown, environment 10 can include any number of cameras 14.

Computer system 20 is shown including a processing component 22 (e.g., one or more processors), a storage component 24 (e.g., a storage hierarchy), an input/output (I/O) component 26 (e.g., one or more I/O interfaces and/or devices), and a communications pathway 28. In general, processing component 22 executes program code, such as monitoring program 30, which is at least partially stored in storage component 24. While executing program code, processing component 22 can read and/or write data to/from storage component 24 and/or I/O component 26. Pathway 28 provides a communications link between each of the components in computer system 20. I/O component 26 can comprise one or more human I/O devices, which enable a human user 12 to interact with computer system 20 and/or one or more communications devices to enable another computer system, such as user 12 and/or camera 14, to communicate with computer system 20 using any type of communications link. To this extent, monitoring program 30 can manage a set of interfaces (e.g., graphical user interface(s), application program interface, and/or the like) that enable human and/or system users 12 to interact with monitoring program 30. Further, monitoring program 30 can manage (e.g., store, retrieve, create, manipulate, organize, present, etc.) the data, such as track information 40, using any solution.

In any event, computer system 20 can comprise one or more general purpose computing articles of manufacture (e.g., computing devices) capable of executing program code installed thereon. As used herein, it is understood that "program code" means any collection of instructions, in any language, code or notation, that cause a computing device having an information processing capability to perform a particular function either directly or after any combination of the following: (a) conversion to another language, code or notation; (b) reproduction in a different material form; and/or (c) decompression. To this extent, monitoring program 30 can be embodied as any combination of system software and/or application software.

Further, monitoring program 30 can be implemented using a set of modules 32. In this case, a module 32 can enable computer system 20 to perform a set of tasks used by monitoring program 30, and can be separately developed and/or implemented apart from other portions of monitoring program 30. As used herein, the term "component" means any configuration of hardware, with or without software, which implements and/or enables a computer system 20 to implement the functionality described in conjunction therewith using any solution, while the term "module" means program code that enables a computer system 20 to implement the functionality described in conjunction therewith using any solution. When embodied in a tangible medium of expression, a module is a component. Regardless, it is understood that two or more components, modules, and/or systems may share some/all of their respective hardware and/or software. Further, it is understood that some of the functionality discussed herein may not be implemented or additional functionality may be included as part of computer system 20.

When computer system 20 comprises multiple computing devices, each computing device can have only a portion of monitoring program 30 embodied thereon (e.g., one or more modules 32). However, it is understood that computer system 20 and monitoring program 30 are only representative of various possible equivalent computer systems that may perform a process described herein. To this extent, in other embodiments, the functionality provided by computer system 20 and monitoring program 30 can be at least partially implemented by one or more computing devices that include any combination of general and/or specific purpose hardware with or without program code. In each embodiment, the hardware and program code, if included, can be created using standard engineering and programming techniques, respectively.

Regardless, when computer system 20 includes multiple computing devices, the computing devices can communicate over any type of communications link. Further, while performing a process described herein, computer system 20 can communicate with one or more other computer systems using any type of communications link. In either case, the communications link can comprise any combination of various types of wired and/or wireless links; comprise any combination of one or more types of networks; and/or utilize any combination of various types of transmission techniques and protocols.

As discussed herein, monitoring program 30 enables computer system 20 to monitor an area using a set of cameras 14. To this extent, FIG. 2 shows an illustrative process for monitoring an area, which can be implemented by computer system 20 (FIG. 1), according to an embodiment. Referring to FIGS. 1 and 2, in process 101, computer system 20 can obtain camera video from camera(s) 14 using any solution. It is understood that the term "video" includes any series of images periodically captured by a single camera 14. To this extent, the camera 14 can capture multiple images every second, an image every few seconds, and/or the like. Computer system 20 can render the images from one or more of the cameras 14 on a monitor for viewing by user 12.

For each image, computer system 20 can process the image to identify zero or more objects that are moving within the imaged area. For example, in process 102, computer system 20 can perform background subtraction and connected component analysis using any solution in order to identify zero or more blobs, each of which corresponds to a region of the image that may include an object in the foreground. In an embodiment, computer system 20 employs an extended mixture of Gaussians BGS to detect the blobs. In particular, computer system 20 can add object level feedback to the mixture of Gaussians BGS. In this case, the object detection by background subtraction can successfully address slow lighting changes, periodic motions from a cluttered background, slow moving objects, long term scene changes, camera noises, and the like. Computer system 20 can perform the BGS on a color image, or in an alternative embodiment, computer system 20 can generate a grayscale image having a lower resolution (e.g., one quarter) of an original color image, and perform the BGS on the grayscale image.

In a more particular embodiment, computer system 20 uses a mixture of K Gaussians, where K=3 to 5, to perform the BGS. In this case, for a pixel X at time t, the probability of the pixel can be written as:

$$P(X_t) = \sum_{i=1}^{K} \omega_{i,t} * \eta(X_t, \mu_{i,t}, \Sigma_{i,t}), \quad (1)$$

where $$\eta(X_t, \mu, \Sigma) = \frac{1}{(2\pi)^{\frac{n}{2}}|\Sigma|^{\frac{1}{2}}} e^{-\frac{1}{2}(X_t - \mu_t)^T \Sigma^{-1}(X_t - \mu_t)}, \quad (2)$$

and $$\omega_{i,t} = (1 - \alpha)\omega_{i,t-1} + \alpha(M_{k,t}). \quad (3)$$

where $\mu$ is the mean, $\alpha$ is the learning rate, and $M_{k,t}$ is 1 for the model that matched and 0 for the remaining models. By assuming the red, green, and blue pixel values are independent and have the same variances, than $\Sigma_{k,t} = \sigma_k^2 I$. After the Gaussians are ordered by the value of $\omega/\alpha$, the first B distributions are chosen as the background model, where $$B = \operatorname{argmin}_b \left( \sum_{k=1}^{b} \omega_k > T \right), \quad (4)$$

where T is the minimum portion of the background model. In an illustrative implementation, K=3 (three Gaussians), $\alpha$=0.005, and T=0.4.

After computer system 20 performs the BGS, computer system 20 can apply object level feedback to the foreground blobs. For example, computer system 20 can apply a set of morphology operators (e.g., combining dilation and erosion) to remove noise and fill small holes in the foreground mask using any solution. Further, computer system 20 can perform connected component analysis to assign an identity to each of the foreground blob(s) identified during BGS using any solution.

In process 103, computer system 20 determines a correspondence between the identified foreground blob(s), if any, with a set of object tracks, if any, that currently exist for the area. To this extent, computer system 20 can compare each blob with track information 40 for each existing object track. For each object track, computer system 20 can manage track information 40, which can include a track model, a track history, and a track state, using any solution. Additionally, computer system 20 can manage blob information 42 for each identified blob, which can include a location of the blob, a height, a width, and can include a color histogram for the blob. For example, computer system 20 can attempt to track objects at the region level, e.g., by determining a correspondence between the blob(s) with the track model(s) of each object track.

In an embodiment, the track model includes a track image, mask, object size (including height and width), and a color histogram for the corresponding object; the track history includes a track length, a track area, and a track position; and the track state indicates whether the track is an incipient track or a stable track. An incipient track is a track that has only been in existence for a short period of time (e.g., less than N frames). Once an incipient track continually exists for the N frames, its state is changed to a stable track. In an illustrative implementation, N is set to three. Additionally, computer system 20 can further classify the state of a stable track as either: normal, occluded, not seen, merge, or fragment. The normal state indicates that the track has a uniquely matched blob and a similarity measure is larger than or equal to a threshold, which can be user-defined. The occluded state is used when the similarity measure is less than the threshold. The states of not seen, merge, and fragment correspond to a temporal fragment (no corresponding blob in an image), merge, and spatial fragment (multiple corresponding blobs in an image), respectively. In an embodiment, computer system 20 only updates the corresponding track model for tracks having a state of normal, occluded, or fragment.

Computer system 20 can combine the object size and the color histogram to generate the track model for an object track. The inclusion of a color histogram in the track model provides an ability to determine a correspondence between blobs and an object track that is robust to changes in the shape, scale, and orientation of the object and is computationally efficient. Further, the inclusion of the object size in the track model enables blobs corresponding to object tracks with different sizes but similar colors to be more readily distinguished than with the color histogram alone. In an embodiment, computer system 20 combines the color histogram and the object size using corresponding weights to generate the track model.

In an illustrative implementation, computer system 20 quantizes a track image T into n colors, $c_1, c_2, \ldots, c_n$. Where $H_T(c_i)$ is the number of pixels with color $c_i$ (where $i \in [n]$) within the mask of the track T and $A_T$ is the area of the track mask, computer system 20 can calculate the color histogram $h_T(c_i)$ using the formula:

$$h_T(c_i) = \frac{H_T(c_i)}{A_T}. \tag{5}$$

Further, computer system 20 can calculate a color similarity measure between two color histograms, $h_T$ and $h_{T1}$, using the formula:

$$S_C(T, T_1) = 1 - \frac{\sum_{i \in n} |h_T(c_i) - h_{T1}(c_i)|}{\sum_{i \in n} h_T(c_i) + h_{T1}(c_i)}. \tag{6}$$

For a track T, the histogram model $h_T(c_i, t)$ at time t is adaptively updated as:

$$h_T(c_i, t) = \lambda h_T(c_i, t-1) + (1-\lambda) h_T^{new}(c_i, t), \tag{7}$$

where $h_T(c_i, t-1)$ is the track model at time $t-1$, $h_T^{new}(c_i, t)$ is the color histogram that is computed by only using the new image and mask of the track T at time t, and $0 \leq \lambda \leq 1$. In a more specific implementation, $\lambda = 0.9$.

Further, computer system 20 can calculate a similarity measure $S(T_{t-1}, B_t)$ ($0 \leq S(T_{t-1}, B_t) \leq 1$) between a blob ($B_t$) at time t and a model ($T_{t-1}$) of a track T at time $t-1$ using the equations:

$$S(T_{t-1}, B_t) = \frac{\rho_C S_C(T_{t-1}, B_t) + \rho_H S_H(T_{t-1}, B_t) + \rho_W S_W(T_{t-1}, B_t)}{\rho_C + \rho_H + \rho_W}, \tag{8}$$

$$S_H(T_{t-1}, B_t) = 1 - \frac{|H_{Bt} - H_{Tt-1}|}{H_{Tt-1}}, \tag{9}$$

and $$S_W(T_{t-1}, B_t) = 1 - \frac{|W_{Bt} - W_{Tt-1}|}{W_{Tt-1}}, \tag{10}$$

where $S_c(T_{t-1}, B_t)$, $S_H(T_{t-1}, B_t)$, and $S_W(T_{t-1}, B_t)$ denote the similarity measures of the color histogram, height, and width for the track T at time t respectively. $H_{Bt}$, $W_{Bt}$, $H_{Tt-1}$, and $W_{Tt-1}$ are the height and width of the blob at time t and the track T at time $t-1$. In an illustrative implementation, computer system 20 can set $S_H(T_{t-1}, B_t) = 0$ if $S_H(T_{t-1}, B_t) < 0$ and similarly for $S_W(T_{t-1}, B_t)$. Further, $\rho_C$, $\rho_H$, and $\rho_W$ are the weights of the color histogram, the height, and the width, respectively, which in an illustrative implementation are set as 2.0, 1.0, and 1.0 respectively. Still further, an illustrative implementation uses a total of 256 bins for the color histogram model with (8, 8, 4) bins for (R, G, B) respectively.

In order to match tracks to foreground blobs, computer system 20 can build a blob list and a track list. When a track begins, computer system 20 can assign a track identifier to each new foreground blob with a sufficient size, e.g., a size greater than a minimum area. Subsequently, computer system 20 can compute a match map based on similarity scores between tracks in the track list and blobs in the blob list, which computer system 20 can store as match information 44. In an embodiment, computer system 20 only computes similarity scores for each track for blobs that are within a search region around the track position. In an illustrative implementation, computer system 20 defines a radius of the search region as $\sqrt{W^2 + H^2}$, where W and H are the width and height of the track model. Further, computer system 20 can use a fixed search radius, e.g., 80 pixels, for tracks having a merge state to process the occlusions because the merge can occur in different ways to make the track size unreliable.

In process 104, computer system 20 evaluates the match information 44 generated (e.g., the match map) in process 103 to perform further processing. Based on a particular correspondence between blob(s) and track(s), computer system 20 can perform different processing. Ideally, computer system 20 will have a one to one matching between each blob and track. However, when tracking objects in the real world, many events and/or BGS limitations cause occlusions, which prevent the one to one matching from always resulting from the evaluation. In general, four types of occlusions occur for stable object tracks, each of which computer system 20 can process differently. A first type of occlusion is a partial occlusion by a static object (e.g., an object being tracked moves behind an object and is only partially visible). A second type of occlusion is a complete occlusion, which can result from movement behind a larger static object or temporal fragmentation due to BGS limitations. A third type of occlusion is occlusion, either partial or complete, by another moving object. A fourth type of occlusion is spatial fragmentation due to BGS limitations, which computer system 20 can process for both stable and incipient tracks.

When a one to one correspondence exists between a blob and an object track (e.g., the track and blob each have a unique match), computer system 20 can assign the blob to the object track, and in process 105, computer system 20 can update track information 40 for the object track. For example, computer system 20 can update the track model and track history for the object track, and/or change a track state, if necessary. As discussed herein, the track model can include a track image, mask, object size, and color histogram, one or more of which computer system 20 can update based on the image currently being processed and/or the blob information 42. Further, the track history can include a track length, a track area, and a track position, one or more of which computer system 20 can update based on the image currently being processed.

Computer system 20 can selectively update track information 40 based on a similarity score between the blob and the object track and a score threshold (e.g., 0.75 on a scale of 0 to 1). For example, when the similarity score is higher than the score threshold, computer system 20 can set the track state to stable, normal and all of the track information 40 can be updated. However, large changes in the color histogram and/or size of the track, which can be caused by partial occlusion by a static object, lighting changes, and/or the like, can cause the similarity score to be lower than the score threshold. In this case, computer system 20 can set the track state stable, occluded, determine a new track position by combining a predicted position, and the blob position, and not update the track model.

For all other correspondence relationships, computer system 20 can perform additional processing prior to updating track information 40 for an object track in process 105. For situation 106, in which a blob exists with no corresponding track, in process 111, computer system 20 can create a new object track and set the state as incipient, and in process 105 computer system 20 can generate the remainder of track information 40 for the incipient track based on the blob information 42.

For situation 107, in which no blobs exist for an object track, the track may be temporarily missing, e.g., completely occluded by a static or moving object or not detected by BGS, or the track may have ended. In this case, in process 112, computer system 20 can predict a new position of the tracked object using any solution. For example, computer system 20 can implement linear prediction to predict the new position based on past centroids for the tracked object. Further, computer system 20 can set the status of the track to not seen. When a track continually has no corresponding blob for a minimum amount of time/number of frames (e.g., 50 frames in an illustrative implementation) or the predicted track position is out of the image, computer system 20 can delete the track and exit from further processing of the track. It is understood that computer system 20 can store some or all of track information 40 for a deleted track for later reference.

For situation 108, in which one blob matches multiple tracks, computer system 20 can perform a merge evaluation in process 113. When at least one stable object track matches the blob, computer system 20 can delete any matching incipient tracks. When multiple stable tracks match the blob, computer system 20 can determine if a merge occurred by combining the histograms of the tracks using any solution. In process 115, computer system 20 can evaluate the similarity score of the combination of tracks. If the similarity score of the combination of tracks is higher than the maximum similarity score of a single track, computer system 20 can assume that a merge occurred and set the status of both tracks to merge. In an embodiment, computer system 20 does not consider the size of the track when determining whether the merge occurred since merges can occur in different ways that make the size an unreliable measure. For merged tracks, computer system 20 does not need to perform segmentation and does not update the track model, instead in process 112, computer system 20 can predict a new position for each merged track, e.g., using linear prediction.

For situation 110, in which multiple blobs match one track, in process 114, computer system 20 can evaluate the blobs to determine if a spatial fragmentation occurred. In an embodiment, computer system 20 can first calculate similarity score(s) between the track model and the unmatched blob(s) of the multiple blobs, i.e., those blobs that are not the best matches for other tracks in the search region. Computer system 20 can then combine the blob model for a blob having the highest similarity score to the track with the blob model for one of the unmatched blobs, and compare the result to the track model for the track. If a similarity score of the track and the combination of the blobs is higher than the similarity score of the single blob, in process 116, computer system 20 accepts the combination and sets the track state to fragment. When different tracks stay very close, e.g., remain located in each other's search region for a sufficient period of time (e.g., a threshold number of frames), computer system 20 can perform process 115, to determine whether the tracks should be merged by evaluating a similarity score of a combination of the tracks. If computer system 20 performs the merge, computer system 20 updates the track information 40 for the merged track. In any event, computer system 20 updates track information 40 for the track in process 105. Computer system 20 can repeat the process until all unmatched blobs have been processed.

For situation 109, in which multiple blobs match multiple tracks, computer system 20 can first perform the merge evaluation in process 113 for each blob as discussed herein, and subsequently perform spatial fragmentation evaluation in process 114 for each track as discussed herein. In this manner, computer system 20 can first identify any blobs that are the result of two tracks merging, and subsequently identify any blobs that should be combined.

It is understood that the process flow shown and described herein is only illustrative. To this extent, numerous variations of the process flow are possible, and are included within the scope of the invention. Illustrative variations include performing one or more processes in parallel and/or a different order, performing additional processes, not performing some processes, and/or the like. To this extent, computer system 20 and/or monitoring program 30 can utilize multiple tasks/threads/processes to perform the actions of the process described herein.

In any event, after processing an image, computer system 20 can generate a tracking visualization 50 for presentation to a user 12 using any solution. The tracking visualization 50 can comprise the most recent image that was processed with information on zero or more tracks superimposed thereon. The track information can include, for example, a bounding box corresponding to an approximate size and location of the tracked object, a line indicating a history of the locations of a centroid of the tracked object within the field of view, and/or the like. Further, computer system 20 can differentiate the superimposed information on different tracks, display additional data on a track (e.g., a status of a track, the moving direction of the track, etc.), and/or the like, using any solution, such as the use of different colors, line types, popup windows, a legend, etc.

Additional details of aspects of the invention are further discussed with reference to illustrative implementations of computer system 20. FIGS. 3A-D show an illustrative series of tracking visualizations 50A-H and BGS results 52A-H generated based on the corresponding original images for an outdoor environment according to an embodiment. As illustrated, computer system 20 independently tracked five objects (an individual walking in front of the parked cars, a car parking, a van moving through the field of view, another individual walking across the grass in the foreground, and a group of people). In the series of images, computer system 20 successfully processes merges, splits, and occlusions (full and partial).

For example, as indicated by BGS result 52A, an individual being tracked by computer system 20 is not detected in an image (e.g., due to BGS error or complete occlusion by a static object). However, computer system 20 continues to track the individual by predicting the position of the individual and matching a blob that is subsequently detected in a later image with the individual's track. Similarly, as illustrated in tracking visualizations 50B-D, computer system 20 successfully tracks a partial occlusion of an object due to another moving object, i.e., the individual due to a car that is being driven and parked.

Tracking visualizations 50E-H illustrate computer system 20 successfully tracking four objects. As illustrated by tracking visualizations 50E-F, computer system 20 successfully processes two occurrences in which a single blob matched multiple tracks (two tracks in BGS result 52E and three tracks in BGS result 52F). Further, in tracking visualization 50G, a merge between the blobs for the group of people and the van and a split of one of the people occur simultaneously. In this situation, the position prediction for the occlusion is temporarily inaccurate as indicated in tracking visualization 50H until the blobs for the two objects split and the individual's blob is rejoined with the group.

Figure 4:
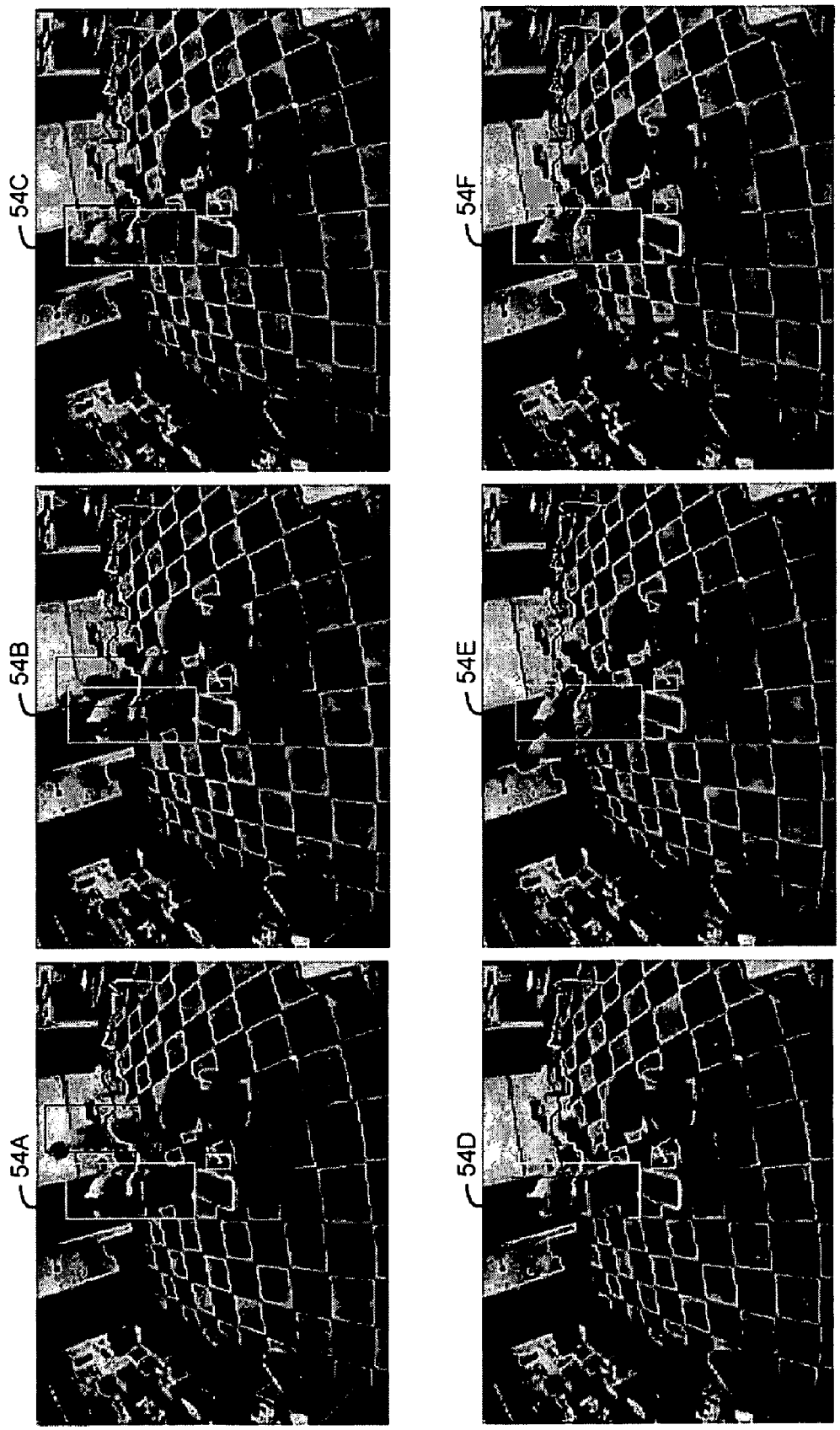
FIG. 4 shows an illustrative series of tracking visualizations in an indoor environment according to an embodiment.

FIG. 4 shows an illustrative series of tracking visualizations 54A-F in an indoor environment according to an embodiment. As illustrated by tracking visualizations 54A-E, computer system 20 successfully tracked two people as various types of occlusions, merges, and splits occurred: a static occlusion and resulting combination of two blobs for the closer individual due to a static object (i.e., a garbage can); a partial occlusion in tracking visualizations 54B-C, E and complete occlusion in tracking visualization 54D of an object due to another moving object; two blobs merging into a single blob in tracking visualization 54B; and a split of a single blob into multiple blobs in tracking visualization 54F.

FIG. 5 shows another illustrative series of tracking visualizations 56A-C and BGS results 58A-C generated based on the corresponding original images according to an embodiment. As illustrated in tracking visualization 56A, computer system 20 initially tracks two individuals walking together as a single object (e.g., due to the single blob in BGS result 58A). As the two individuals walk, the single blob spatially fragments into multiple blobs both due to limits in the BGS and a separation between the individuals in the image. Since the separation between the images is less than a separation threshold, computer system 20 combines the separate blobs and maintains a single track.

While shown and described herein as a method and system for monitoring an area, it is understood that aspects of the invention further provide various alternative embodiments. For example, in one embodiment, the invention provides a computer program embodied in at least one computer-readable medium, which when executed, enables a computer system to monitor an area. To this extent, the computer-readable medium includes program code, such as monitoring program 30 (FIG. 1), which implements some or all of a process described herein. It is understood that the term "computer-readable medium" comprises one or more of any type of tangible medium of expression capable of embodying a copy of the program code (e.g., a physical embodiment). For example, the computer-readable medium can comprise: one or more portable storage articles of manufacture; one or more memory/storage components of a computing device; paper; and/or the like. Further, a copy of the program code can be transitory, e.g., embodied in a modulated data signal having one or more of its characteristics set and/or changed in such a manner as to encode information in the signal.

In another embodiment, the invention provides a method of providing a copy of program code, such as monitoring program 30 (FIG. 1), which implements some or all of a process described herein. In this case, a computer system can generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of program code that implements some or all of a process described herein, which includes a computer system receiving the set of data signals described herein, and translating the set of data signals into a copy of the computer program embodied in at least one computer-readable medium. In either case, the set of data signals can be transmitted/received using any type of communications link.

In still another embodiment, the invention provides a method of generating a system for monitoring an area. In this case, a computer system, such as computer system 20 (FIG. 1), can be obtained (e.g., created, maintained, made available, etc.) and one or more modules for performing a process described herein can be obtained (e.g., created, purchased, used, modified, etc.) and deployed to the computer system. To this extent, the deployment can comprise one or more of: (1) installing program code on a computing device from a computer-readable medium; (2) adding one or more computing and/or I/O devices to the computer system; and (3) incorporating and/or modifying the computer system to enable it to perform a process described herein.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A method of monitoring an area, the method comprising:
obtaining blob information for at least one blob in a set of blobs identified in an image of the area, each blob corresponding to a region of the image that may include a foreground object, the blob information including a color histogram, a height, and a width for the at least one blob;
determining a correspondence between the at least one blob and a set of object tracks using the blob information and a model for each object track, wherein the model includes a color histogram, a height, and a width for a tracked object, the determining including:
generating match information for the at least one blob and the set of object tracks, the match information including a set of match maps, each of which matches the at least one blob to one of the set of object tracks; and
assigning each of the at least one blob to an object track based on the match information, wherein the assigning includes evaluating a plurality of blobs for spatial fragmentation when the plurality of blobs match a single track, the evaluating including:
combining the blob information for at least two of the plurality of blobs that match the single track;
determining whether a similarity score for the combined blob information is greater than the individual similarity scores for both blob information for each of the at least two of the plurality of blobs that match the single object track; and
accepting the combined blob information when the similarity score is greater; and
updating information on the set of object tracks based on the determining.

2. The method of claim 1, further comprising processing the image to identify the set of blobs, the processing including:
applying a mixture of Gaussians background subtraction to generate a foreground mask;
applying a set of morphology operators to remove noise in the foreground mask; and
performing connected component analysis to assign an identity to each blob in the set of blobs.

3. The method of claim 1, further comprising processing the image to identify the set of blobs, wherein the image is a color image, the processing including:

generating a grayscale image based on the image, wherein the grayscale image has a lower resolution than the image; and performing background subtraction on the grayscale image.

4. The method of claim 1, the determining including calculating a similarity measure between the at least one blob and the object track, the calculating including:

calculating a color similarity measure of the color histogram for the model for the object track and the color histogram for the at least one blob;

calculating a height similarity measure of the height for the model for the object track and the height for the at least one blob;

calculating a width similarity measure of the width for the model for the object track and the width for the at least one blob; and combining the color, height, and width similarity measures to obtain the similarity measure between the at least one blob and the object track.

5. The method of claim 4, wherein the combining includes:

obtaining a weight for each of the color, height, and width similarity measures; and calculating a weighted sum for the color, height, and width similarity measures using the corresponding weights.

6. The method of claim 1, wherein the assigning includes:

assigning a blob to a matching object track when there is a one to one correspondence between the blob and the matching object track; and creating a new object track when a blob does not match any object track in the set of object tracks.

7. The method of claim 1, wherein the assigning includes performing a merge evaluation for a plurality of object tracks when a blob matches each of the plurality of object tracks, the merge evaluation including:

deleting any incipient object tracks that match the blob when at least one stable object track matches the blob;

combining the color histograms for at least two stable object tracks that match the blob; and determining whether a similarity score for the combined color histograms is greater than the individual similarity scores for both color histograms for each of the at least two stable object tracks; and merging the at least two stable object tracks when the similarity score is greater.

8. The method of claim 1, wherein the updating includes predicting a location of a tracked object for an object track based on track history for the object track when no blob matches the object track.

9. A system for monitoring an area, the system comprising:

a component configured to obtain blob information for at least one blob in a set of blobs identified in an image of the area, each blob corresponding to a region of the image that may include a foreground object, the blob information including a color histogram, a height, and a width for the at least one blob;

a component configured to determine a correspondence between the at least one blob and a set of object tracks using the blob information and a model for each object track, wherein the model includes a color histogram, a height, and a width for a tracked object, the determining including:

generating match information for the at least one blob and the set of object tracks, the match information including a set of match maps, each of which matches the at least one blob to one of the set of object tracks; and assigning each of the at least one blob to an object track based on the match information, wherein the assigning includes evaluating a plurality of blobs for spatial fragmentation when the plurality of blobs match a single track, the evaluating including:

combining the blob information for at least two of the plurality of blobs that match the single track;

determining whether a similarity score for the combined blob information is greater than the individual similarity scores for both blob information for each of the at least two of the plurality of blobs that match the single object track; and accepting the combined blob information when the similarity score is greater; and a component configured to update information on the set of object tracks based on the determined correspondence.

10. The system of claim 9, further comprising a component configured to process the image to identify the set of blobs.

11. The system of claim 9, wherein the component configured to determine is configured to calculate a similarity measure between the at least one blob and an object track, the calculating including:

calculating a color similarity measure of the color histogram for the model for the object track and the color histogram for the at least one blob;

calculating a height similarity measure of the height for the model for the object track and the height for the at least one blob;

calculating a width similarity measure of the width for the model for the object track and the width for the at least one blob; and combining the color, height, and width similarity measures to obtain the similarity measure between the at least one blob and the object track.

12. The system of claim 9, wherein the component configured to determine is configured to generate match information for the at least one blob and the set of object tracks, the match information including a set of match maps, each of which matches the at least one blob to one of the set of object tracks, and assign each of the at least one blob to an object track based on the match information.

13. The system of claim 12, wherein the component configured to update is configured to predict a location of a tracked object for an object track based on track history for the object track when no blob matches the object track.

14. A computer program comprising program code embodied in at least one non-transitory computer-readable medium, which when executed, enables a computer system to implement a method of monitoring an area, the method comprising:

obtaining blob information for at least one blob in a set of blobs identified in an image of the area, each blob corresponding to a region of the image that may include a foreground object, the blob information including a color histogram, a height, and a width for the at least one blob;

determining a correspondence between the at least one blob and a set of object tracks using the blob information and a model for each object track, wherein the model includes a color histogram, a height, and a width for a tracked object, the determining including:

generating match information for the at least one blob and the set of object tracks, the match information including a set of match maps, each of which matches the at least one blob to one of the set of object tracks; and assigning each of the at least one blob to an object track based on the match information, wherein the assigning includes evaluating a plurality of blobs for spatial fragmentation when the plurality of blobs match a single track, the evaluating including:
  combining the blob information for at least two of the plurality of blobs that match the single track;
  determining whether a similarity score for the combined blob information is greater than the individual similarity scores for both blob information for each of the at least two of the plurality of blobs that match the single object track; and
  accepting the combined blob information when the similarity score is greater; and
updating information on the set of object tracks based on the determining.

15. The computer program of claim 14, the method further comprising processing the image to identify the set of blobs, wherein the image is a color image, the processing including:
  generating a grayscale image based on the image, wherein the grayscale image has a lower resolution than the image;
  applying a mixture of Gaussians background subtraction on the grayscale image to generate a foreground mask;
  applying a set of morphology operators to remove noise in the foreground mask; and
  performing connected component analysis to assign an identity to each blob in the set of blobs.

16. The computer program of claim 14, the determining including calculating a similarity measure between the at least one blob and an object track, the calculating including:
  calculating a color similarity measure of the color histogram for the model for the object track and the color histogram for the at least one blob;
  calculating a height similarity measure of the height for the model for the object track and the height for the at least one blob;
  calculating a width similarity measure of the width for the model for the object track and the width for the at least one blob;
  obtaining a weight for each of the color, height, and width similarity measures; and
  calculating a weighted sum for the color, height, and width similarity measures using the corresponding weights, wherein the similarity measure between the at least one blob and the object track is based on the weighted sum.

17. The computer program of claim 14, the determining including:
  generating match information for the at least one blob and the set of object tracks, the match information including a set of match maps, each of which matches the at least one blob to one of the set of object tracks; and
  assigning each of the at least one blob to an object track based on the match information.

18. The computer program of claim 17, wherein the assigning includes:
  assigning a blob to a matching object track when there is a one to one correspondence between the blob and the matching object track;
  creating a new object track when a blob does not match any object track in the set of object tracks;
  performing a merge evaluation for a plurality of object tracks when a blob matches each of the plurality of object tracks; and
  evaluating a plurality of blobs for spatial fragmentation when the plurality of blobs match a single object track, and wherein the updating includes predicting a location of a tracked object for an object track based on track history for the object track when no blob matches the object track.

19. A method of generating a system for monitoring an area, the method comprising:
  providing a computer system operable to:
  obtain blob information for at least one blob in a set of blobs identified in an image of the area, each blob corresponding to a region of the image that may include a foreground object, the blob information including a color histogram, a height, and a width for the at least one blob;
  determine a correspondence between the at least one blob and a set of object tracks using the blob information and a model for each object track, wherein the model includes a color histogram, a height, and a width for a tracked object, the determining including:
    generating match information for the at least one blob and the set of object tracks, the match information including a set of match maps, each of which matches the at least one blob to one of the set of object tracks; and
    assigning each of the at least one blob to an object track based on the match information, wherein the assigning includes evaluating a plurality of blobs for spatial fragmentation when the plurality of blobs match a single track, the evaluating including:
      combining the blob information for at least two of the plurality of blobs that match the single track;
      determining whether a similarity score for the combined blob information is greater than the individual similarity scores for both blob information for each of the at least two of the plurality of blobs that match the single object track; and
      accepting the combined blob information when the similarity score is greater; and
  update information on the set of object tracks based on the determining.

* * * * *